US009919266B2

(12) United States Patent
Johnson et al.

(10) Patent No.: US 9,919,266 B2
(45) Date of Patent: Mar. 20, 2018

(54) SYSTEMS AND METHODS FOR TREATMENT OF FLUE GAS

(71) Applicant: Fluor Technologies Corporation, Sugar Land, TX (US)

(72) Inventors: Dennis W. Johnson, Simpsonville, SC (US); James H. Brown, Simpsonville, SC (US)

(73) Assignee: Fluor Technologies Corporation, Sugar Land, TX (US)

( * ) Notice: Subject to any disclaimer, the term of this patent is extended or adjusted under 35 U.S.C. 154(b) by 0 days.

(21) Appl. No.: 14/995,774

(22) Filed: Jan. 14, 2016

(65) Prior Publication Data

US 2017/0203252 A1 Jul. 20, 2017

(51) Int. Cl.
*B01D 53/50* (2006.01)
*B01D 53/79* (2006.01)

(52) U.S. Cl.
CPC .......... *B01D 53/508* (2013.01); *B01D 53/79* (2013.01); *B01D 2251/606* (2013.01); *B01D 2251/608* (2013.01)

(58) Field of Classification Search
None
See application file for complete search history.

(56) References Cited

U.S. PATENT DOCUMENTS

| 4,611,652 | A | * | 9/1986 | Bernstein | C23F 15/00 122/20 B |
|---|---|---|---|---|---|
| 8,414,852 | B1 | | 4/2013 | Johnson et al. | |
| 8,591,844 | B1 | | 11/2013 | Johnson et al. | |
| 8,882,896 | B2 | | 11/2014 | Johnson et al. | |
| 8,951,489 | B2 | | 2/2015 | Priest et al. | |
| 9,034,081 | B2 | | 5/2015 | Johnson | |
| 9,108,123 | B2 | | 8/2015 | Johnson et al. | |
| 2004/0247506 | A1 | * | 12/2004 | Chowdhury | B01D 53/40 423/220 |
| 2010/0037678 | A1 | * | 2/2010 | Chothani | G01N 27/14 73/25.01 |
| 2012/0152362 | A1 | | 6/2012 | Johnson et al. | |
| 2013/0125752 | A1 | | 5/2013 | Johnson | |
| 2013/0125754 | A1 | | 5/2013 | Johnson et al. | |
| 2013/0129588 | A1 | | 5/2013 | Johnson et al. | |
| 2013/0139696 | A1 | | 6/2013 | Johnson et al. | |
| 2013/0309156 | A1 | | 11/2013 | Johnson et al. | |
| 2014/0026755 | A1 | | 1/2014 | Johnson et al. | |
| 2014/0124068 | A1 | | 5/2014 | Johnson | |
| 2014/0165888 | A1 | | 6/2014 | Johnson et al. | |
| 2014/0234788 | A1 | | 8/2014 | Johnson et al. | |
| 2014/0339815 | A1 | | 11/2014 | Johnson et al. | |

* cited by examiner

*Primary Examiner* — Sheng H Davis
(74) *Attorney, Agent, or Firm* — Conley Rose, P.C.

(57) ABSTRACT

A method for treating a flue gas that includes determining a sulfur trioxide concentration within the flue gas and determining an injection rate for a sulfur trioxide sorbent based upon the sulfur trioxide concentration. Also, a method for treating a flue gas that includes determining a sulfuric acid dew point for the flue gas and determining a coolant injection rate for a coolant to be injected into the flue gas to cause the flue gas to have a temperature of from about 20 to about 30° F. above the sulfuric acid dew point.

10 Claims, 4 Drawing Sheets

SYSTEMS AND METHODS FOR TREATMENT OF FLUE GAS

FIELD OF INVENTION

The subject matter disclosed herein relates to systems and methods for the post-combustion treatment of a flue gas.

BACKGROUND

Fossil fuel combustion is an important source of power generation, and is responsible for supplying a major portion of the world's power needs. Unfortunately, the exhaust gases that result from burning fossil fuels, called "flue gases," may contain many harmful and/or undesirable air pollutants, such as nitrogen oxides ($NO_x$), sulfur oxides ($SO_x$), carbon monoxide, carbon dioxide, hydrogen, mercury, ash, other volatile organic compounds, and heavy metals. These flue gas pollutants are a major contributor of pollutants to the atmosphere and environment.

In addition, many national and local governments have enacted environmental laws and regulations that limit and/or restrict the release of specific pollutants into the environment. In response, entities that rely upon the combustion of fossil fuels to power industrial processes, such as power production entities, have developed and implemented systems and methods for removing pollutants from flue gases. These new systems and methods add significant complexity and costs to the use (e.g., combustion) of fossil fuels in industrial settings (e.g., power production), resulting in higher prices to the consumer and the increased complexity for the producer. There is great need for improved flue gas treatment methods and systems, in order to decrease the costs and complexity of power production.

Conventional post-combustion treatment processes utilize multistage designs and/or processes, in which various additives (e.g., oxidizers, sorbents, and/or reducing agents) are separately injected into with the flue gas at different stages. Each additive (e.g., oxidizer, reducing agent, and/or absorbent) must then be thoroughly mixed with the flue gas, for example, to ensure that a particular additive is sufficiently allowed to interact with one or more pollutants (e.g., nitrogen oxides ($NO_x$), sulfur oxides ($SO_x$), carbon monoxide, carbon dioxide, hydrogen, mercury, ash, other volatile organic compounds, or heavy metals present within the flue gas). This multistage approach can be very complex and costly since each targeted pollutant requires its own additive. Such additives can add significantly to the cost associated with flue gas treatment. As such, there is a need to reduce the amount of such additives that are added to a flue gas to not more than is necessary for the effective removal of at least one pollutant from the flue gas and/or to improve the efficiency with which such additives are able to remove pollutants from the flue gas.

SUMMARY

Disclosed herein is a method for treating a flue gas. The method comprises determining a sulfur trioxide concentration within the flue gas. The method also comprises determining an injection rate for a sulfur trioxide sorbent based upon the sulfur trioxide concentration.

Also disclosed herein is a system for treating a flue gas. The system comprises a sorbent injector configured to inject a sulfur trioxide sorbent into the flue gas. The sorbent injector comprises a variable-rate feed mechanism configured to inject the sorbent at a selected sorbent injection rate. The sorbent injector also comprises a sulfur trioxide sorbent rate processor. The sorbent rate processor is configured to carry out a method that comprises determining a sulfur trioxide concentration within the flue gas and determining an injection rate for the sulfur trioxide sorbent based upon the sulfur trioxide concentration.

Also disclosed herein is another method for treating a flue gas. The method comprises determining a sulfuric acid dew point for the flue gas. The method also comprises determining a coolant injection rate for a coolant to be injected into the flue gas to cause the flue gas to have a temperature of from about 20 to about 30° F. above the sulfuric acid dew point.

Also disclosed herein is a system for treating a flue gas. The system comprises a coolant injector configured to inject a coolant into the flue gas. The coolant injector comprises a variable-rate injection mechanism configured to inject the coolant at a selected coolant injection rate. The coolant injector also comprises a coolant rate processor. The coolant rate processor is configured to carry out a method comprising determining a sulfuric acid dew point for the flue gas and determining a coolant injection rate for the coolant to be injected into the flue gas to cause the flue gas to have a temperature of from about 20 to about 30° F. above the sulfuric acid dew point.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Disclosed herein are embodiments of systems and methods for the post-combustion treatment of a flue gas. More particularly, disclosed herein are embodiments of systems and methods for controlling the injection of an additive (e.g., oxidizer, reducing agent, and/or sorbent) into a flue gas and embodiments of systems and methods for improving the efficiency of an additive (e.g., oxidizer, reducing agent, and/or absorbent) introduced into a flue gas for the purpose of removing a pollutant (e.g., nitrogen oxides ($NO_x$), sulfur oxides ($SO_x$), carbon monoxide, carbon dioxide, hydrogen, mercury, ash, other volatile organic compounds, or heavy metals present within the flue gas) therefrom.

Figure 1:
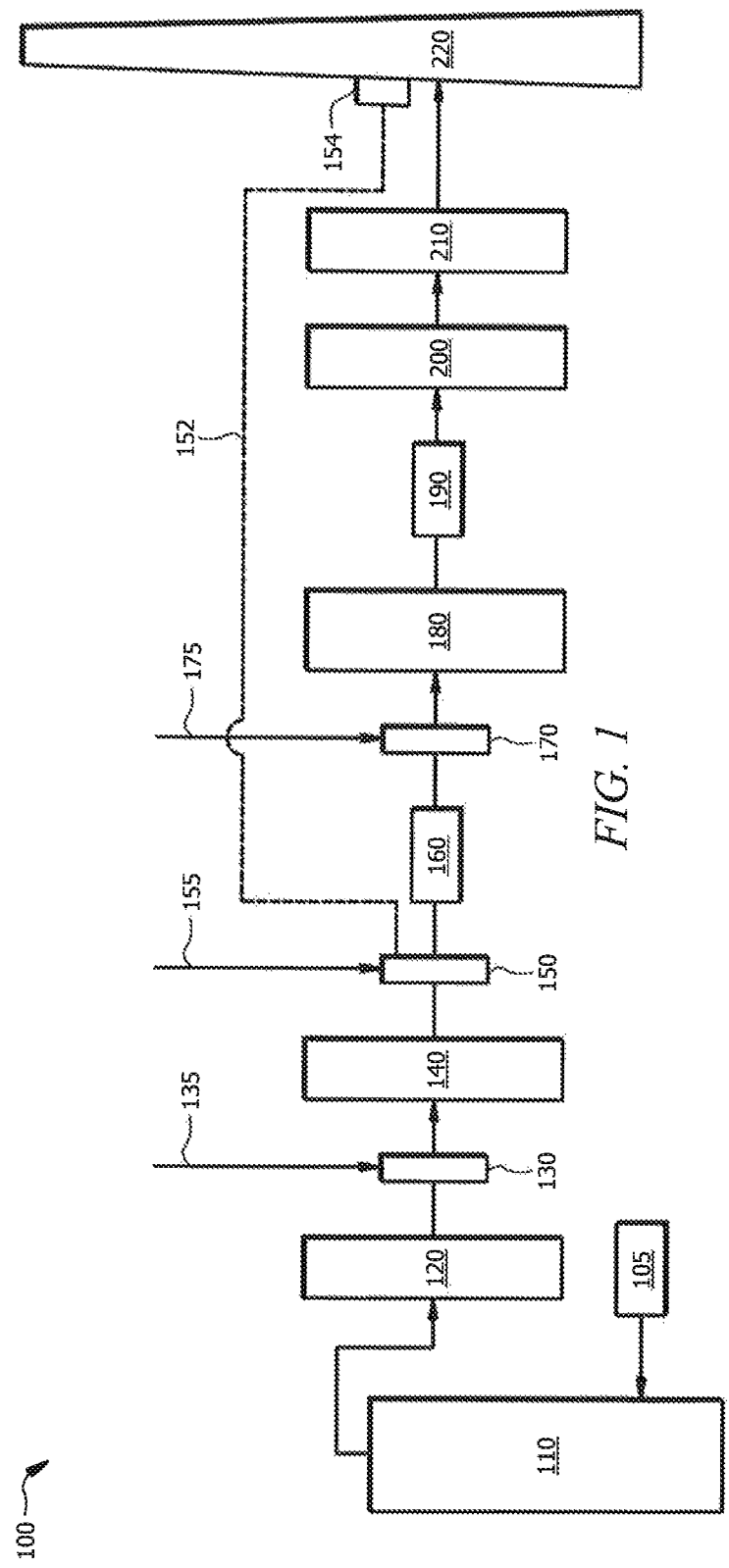
FIG. 1 illustrates a flue gas treatment system according to an embodiment disclosed herein.

Referring to FIG. 1, an embodiment of a flue gas treatment (FGT) system 100 for, among others, removing $NO_x$, $SO_x$, mercury, and $CO_2$ from flue gas is illustrated. In the embodiment of FIG. 1, the FGT system 100 is particularly configured for controlling the injection of an additive (particularly, a sorbent) into a flue gas so as to remove a pollutant (particularly, $SO_x$, such as $SO_3$) therefrom.

The FGT system 100 of FIG. 1 generally comprises a blower 105, a boiler 110, a heat exchanger 120, a $NO_x$ reducing agent injector 130, a selective catalytic reduction (SCR) reactor 140, a $SO_x$ sorbent injector 150, an air heater 160, a carbon injector 170, a particulate material (PM) collector 180, a line blower 190, a flue gas desulfurizer (FGD) 200, a flue gas $CO_2$ processor 210, and a stack 220.

In the embodiment of FIG. 1, the boiler 110 is generally configured to burn a fossil fuel. Examples of the fossil fuel include, but are not limited to, coal, oil and/or hydrocarbons (e.g., fuel oils, natural gas, for example, sour gas, kerosene, diesel, or various other alkanes, cycloalkanes, and aromatics), and/or coke. The blower 105 (e.g., a forced draft blower or fan) blows the flue gases resulting from the combustion process through the boiler 110 and to heat exchanger 120. Heat exchanger tubes can be present in the boiler to heat a process fluid. For example, water can be converted to steam for use in power generation. An additional heat exchanger (e.g., an "economizer") is configured to provide heat exchange between the flue gas and a colder fluid stream, for example, such that the flue gas is cooled.

After exiting the heat exchanger 120, a $NO_x$ reducing agent 135 is injected into the flue gas via the $NO_x$ reducing agent injector 130. An example of the NOx reducing agent 135 is ammonia. The $NO_x$ reducing agent injector 130 is generally configured to inject the $NO_x$ reducing agent 135 into the flue gas pathway. The $NO_x$ reducing agent injector 130 provides a route of fluid communication for the $NO_x$ reducing agent 135 to be introduced into the flue gas, for example, via a conduit between the heat exchanger 120 and the SCR reactor 140. The SCR reactor 140 is configured to mix the flue gas and $NO_x$ reducing agent 135. In an embodiment, the SCR reactor 140 comprises a catalyst, for example, to catalyze a reaction between $NO_x$ present within the flue gas and the reducing agent to yield into diatomic nitrogen ($N_2$) and water ($H_2O$) via a reaction on a catalyst surface.

After exiting the SCR reactor 140, a $SO_x$ sorbent 155 is injected into the flue gas via the $SO_x$ sorbent injector 150. The $SO_x$ sorbent 155 is generally provided to control, among others, the presence of $SO_3$ (sulfur trioxide) in the flue gas, for example, such that the sorbent interacts with $SO_3$ in the flue gas to remove (e.g., sequester) at least a portion of the $SO_3$ present in the flue gas therefrom. Additionally or alternatively, the $SO_x$ sorbent 155 may be effective to remove (e.g., sequester) at least a portion of the $SO_2$, HCl, HF, other acid gas, or combinations thereof from the flue gas. Examples of a suitable $SO_x$ sorbent include, but are not limited to, limestone, lime, hydrated lime, trona (trisodium hydrogendicarbonate dihydrate also sodium sesquicarbonate dihydrate), sodium carbonate, sodium bicarbonate, sodium bisulfate, and combinations thereof.

The $SO_x$ sorbent injector 150 is generally configured to inject the $SO_x$ sorbent reagent (e.g., limestone) into the flue gas, for example, via a conduit extending between the SCR reactor 140 and the air heater 160. In the embodiment of FIG. 1, the $SO_x$ sorbent injector 150 is a $SO_3$ dependent sorbent feed rate (SDSFR) injector; that is, the SDSFR $SO_x$ sorbent injector 150 is configured to inject sorbent into the flue gas dependent upon the concentration of $SO_3$ in the flue gas, as will be disclosed herein.

In the embodiment of FIG. 1, the SDSFR $SO_x$ sorbent injector 150 receives signals from one or more sensors 154 via a datalink 152. The signals received from the one or more sensors 154 via the datalink 152 indicate one or more parameters of the flue gas, for example, the concentration of various components of the flue gas, as will be disclosed herein. While the embodiment of FIG. 1 illustrates the one or more sensors being located at or proximate to the stack 220 (e.g., such that the sensors determine at least a part of the composition of the flue gas within the stack 220), in additional or alternative embodiments, one or more of the sensors may be positioned at any suitable location within the FGT system 100, for example, at a location downstream with respect to the $SO_x$ sorbent injector 150. For example, in alternative embodiments, one or more sensors being otherwise similar to the sensors 154 illustrated in FIG. 1 may be positioned so as to determine at least a portion of the composition of the flue proximate to the air heater 160, the carbon injector 170, the particulate material (PM) collector 180, the line blower 190, the FGD 200, the flue gas $CO_2$ processor 210, the stack 220, or at a location between any two adjacent of these components.

Figure 2:
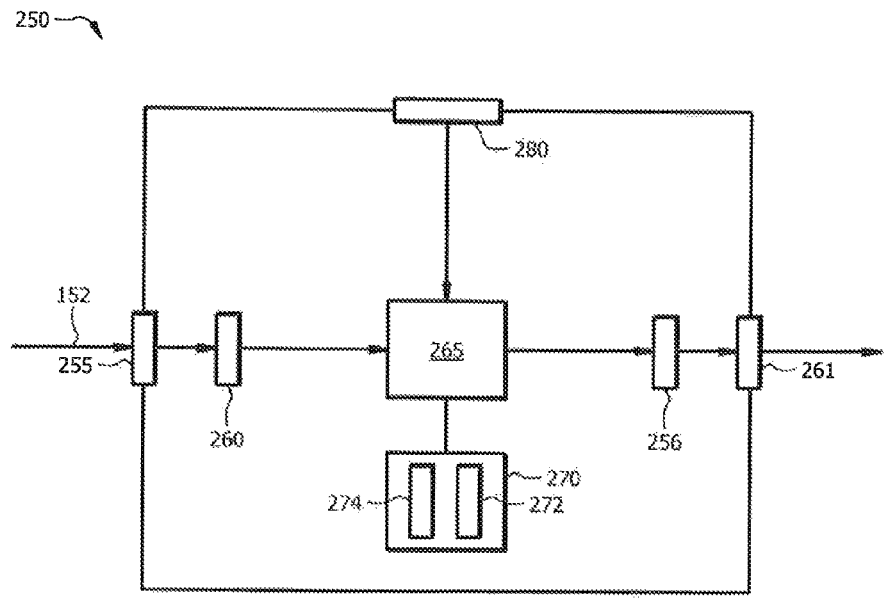
FIG. 2 illustrates an embodiment of a determination and control system for use in the flue gas treatment system of FIG. 1.

In an embodiment, the SDSFR $SO_x$ sorbent injector 150 comprises a determination and control system (DCS). Referring to FIG. 2, an embodiment of the DCS 250 is illustrated. The DCS comprises ports 255 and 256, transceiver units 260 and 261, a processor 265, memory 270 including a $SO_3$ determination module 272 and sorbent feed rate determination module 274, and a user interface 280. Port 255 receives data signals from datalink 152 and is coupled to the transceiver unit 260. While the embodiment of FIG. 2 includes a transceiver unit 260, in alternative embodiments, an otherwise similar DCS includes transmitters, receivers, or combinations thereof. The transceiver unit 260 receives data (e.g., flue gas composition data) via the port 255. The transceiver unit 260 forwards the received data (e.g., flue gas composition data) to the processor 265. In an embodiment, a DCS may also comprise electrical-to-optical (EO) components and optical-to-electrical (OE) components coupled to one or more ports and/or to one or both transceiver units for receiving and transmitting electrical signals and/or optical signals.

The processor 265 is generally configured to process data such as the flue gas composition data as well as additional process data such as a plant power output, fuel composition properties (e.g., fuel sulfur content), combustion air flowrate, and the like. In various embodiments, the processor 265 is implemented by hardware and software performed on that hardware. For instance, in the embodiment of FIG. 2, the processor 265 is implemented via one or more central processing unit (CPU) chips, logic units, cores (e.g., as a multi-core processor), field-programmable gate arrays (FPGAs), application specific integrated circuits (ASICs), and digital signal processors (DSPs).

Additionally or alternatively, in an embodiment, the processor 265 includes a plurality of functional modules. In an embodiment, the functional module refers to a hardware component (e.g., an integrated circuit (IC)) configured to perform at least one function, for example, an amplifier or a buffer. In some embodiments, the functional module performs multiple functions (e.g., on a single chip). In various embodiments, the functional module comprises a group of components (e.g., transistors, resistors, capacitors, diodes, and/or inductors) on an IC which may perform a defined function. In various embodiments, a functional module includes a specific set of inputs, a specific set of outputs, and/or an interface (e.g., an electrical interface, a logical interface, and/or other interfaces) with other functional modules of the IC and/or with external components. In some embodiments, the processor 265 includes repeat instances of a function module (e.g., multiple flip-flops or adders on a single chip); alternatively, the processor 265 includes two or more different types of functional modules which may together provide the functional module with its overall functionality. For example, in an embodiment, the processor 265 includes a microprocessor including functional modules such as an arithmetic logic unit (ALU), one or more floating point units (FPU), one or more load or store units, one or more branch prediction units, one or more memory controllers, and other such modules. In some embodiments, a functional module may be further subdivided into component functional modules. For example, a microprocessor as a whole may be viewed as a functional module of an IC, for example, if the microprocessor shares a circuit with at least one other functional module (e.g., a cache memory unit).

Various examples of a functional module include, but are not limited to, a software implementation, a general purpose processor, a mathematical processor, a state machine, a digital signal processor (DSP), a video processor, an audio processor, a logic unit, a logic element, a multiplexer, a demultiplexer, a switching unit, a switching element, an input/output (I/O) element, a peripheral controller, a bus, a bus controller, a register, a combinatorial logic element, a storage unit, a programmable logic device, a memory unit, a neural network, a sensing circuit, a control circuit, a digital to analog converter, an oscillator, a memory, a filter, an amplifier, a mixer, a modulator, a demodulator, and/or any other suitable devices as would be appreciated by one of ordinary skill in the art. In an embodiment, one or more functional modules are electrically connected to and/or in signal communication with other functional modules via a wired connection (e.g., via a copper wire or a metal trace) and/or a wireless connection (e.g., via an antenna), and/or any other suitable type and/or configuration of connections as would be appreciated by one of ordinary skill in the art upon viewing this disclosure.

In FIG. 2, the processor 265 is in signal communication with memory 270. Memory 270 is configured to store data, to store the $SO_3$ determination module 272 (which contains instructions causing the processor 265 to implement instructions so as to determine the concentration of $SO_3$ present within the flue gas based upon the concentration of various other components of the flue gas) and the sorbent feed rate determination module 274 (which contains instructions causing the processor 265 to implement instructions so as to determine the rate at which sorbent should be injected into the flue gas based upon the concentration of $SO_3$ in the flue gas, alone or in combination with other parameters such as the plant power output, the fuel composition properties, the combustion air flowrate, and the like). In various embodiments, the memory 270 comprises one or more of disks, tape drives, or solid-state drives. In various embodiments, the memory 270 includes volatile memory, alternatively, non-volatile memory, alternatively, read-only memory (ROM), random-access memory (RAM), ternary content-addressable memory (TCAM), static random-access memory (SRAM), or combinations thereof. While in the embodiment of FIG. 2, the $SO_3$ determination module 272 and sorbent feed rate determination module 274 are illustrated and disclosed as discreet components; in alternative embodiments, an otherwise similar DCS may include a signal module carrying out the functionalities disclosed herein with respect to the $SO_3$ determination module 272 and sorbent feed rate determination module 274.

Figure 3:
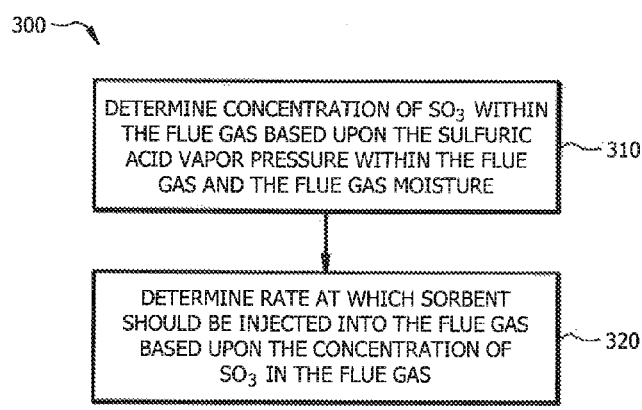
FIG. 3 illustrates an embodiment of a flue gas treatment method.

Referring to FIG. 3, the $SO_3$ determination module 272 and sorbent feed rate determination module 274 cooperatively cause the processor 265 to execute a method 300 that includes the steps of determining the concentration of $SO_3$ within the flue gas based upon the sulfuric acid vapor pressure within the flue gas and the flue gas moisture (step 310) and determining a rate at which sorbent should be injected into the flue gas based upon the concentration of $SO_3$ in the flue gas (step 320). Additionally, in an embodiment, the $SO_3$ determination module 272 and/or sorbent feed rate determination module 274 cause the processor 265 to execute instructions that further include transmitting a control signal effective to control the rate at which the sorbent is injected into the flue gas. While in the embodiment of FIGS. 2 and 3, the steps of determining the concentration of $SO_3$ within the flue gas based upon the sulfuric acid vapor pressure within the flue gas and the flue gas moisture 310 and, determining a rate at which sorbent should be injected into the flue gas based upon the concentration of $SO_3$ in the flue gas 320 are disclosed as taking place within the DCS 250; in alternative embodiments, one or more of these steps may be distributed to other components. For example, in an embodiment, the step of determining the concentration of $SO_3$ within the flue gas based upon the sulfuric acid vapor pressure within the flue gas and the flue gas moisture 310 may be carried out via the operation of a commercially available $SO_3$ Detection and/or Measurement component, an example of which is the "AbSensor" available from Breen in Carnegie, Pa. Upon determining the rate at which sorbent should be injected into the flue gas based upon the concentration of $SO_3$ in the flue gas 320, the processor 265 forwards a suitable control signal to a suitable variable-rate feed mechanism via transceiver unit 261 and port 256. In various embodiments, such a variable-rate feed mechanism is generally configured to continuously feed sorbent (e.g., dry sorbent from storage silos, for example, capable of storing a total of 5 to 10 day's usage of sorbent material) to one or more injection ports in fluid communication with the flue gas. In an embodiment, a fluidizing bottom in each silo may be employed to aid in flow of the stored sorbent. A valve (e.g., an automated butterfly valve) at the bottom of the silo cone releases sorbent to a feeder system below. The feeder hopper may be mounted to the silo via load cells linked to a control system. A rotary valve discharges material through a vented chute directly to a blow-through airlock (e.g., a rotary airlock) running at constant speed and into a pneumatic conveyance system. The rotary valve may be operated at a variable frequency, thus, serves as the metering device. In an embodiment, the pneumatic conveyance system is a dilute phase positive pressure pneumatic system and is used to transfer sorbent and inject it into the flue gas.

In some embodiments, the $SO_3$ determination module 272 and sorbent feed rate determination module 274 can use the concentration of $SO_3$ within the flue gas along with other parameters of the process such as the plant power output, the fuel composition properties, the combustion air flowrate, and the like to determine a rate at which sorbent should be injected into the flue gas. In this embodiment, various upstream parameters can be used as a feed forward input for the determination of the rate for the sorbent injection. For example, if the fuel properties or power output change, the sorbent injection rate can be changed without relying on a feedback mechanism based on the concentration of $SO_3$ within the flue gas. All of the parameters can be included by the $SO_3$ determination module 272 and sorbent feed rate determination module 274 to control the concentration of $SO_3$ within the flue gas to less than a desired level or threshold.

The amount of sorbent injected into the flue gas stream can generally be sufficient to reduce the concentration of the $SO_3$ within the flue gas to less than a threshold. The present systems may advantageously allow the amount of sorbent to be reduced relative to other systems in which a large excess of sorbent is injected in order to ensure removal of the $SO_3$. The system disclosed herein may allow less than a 100% excess, less than an 80% excess, less than a 60% excess, less than a 40% excess, or less than a 20% excess of the stoichiometric amount of sorbent to be injected while still achieving a desired $SO_3$ removal rate from the flue gas. In an embodiment, the systems disclosed herein allow for the amount of sorbent employed to more closely match the stoichiometric amount required for the reactions, for example, in comparison to conventional systems.

Returning to FIG. 1, after the flue gas exits the $SO_x$ sorbent injector 150, the air heater 160 then heats the flue gas and $SO_x$ sorbent (e.g., limestone) mixture. Activated carbon 175 can be injected into the flue gas via the carbon injector 170, and the flue gas is sent to the PM collector 180. The PM collector 180 is generally configured to collect various particulate materials (e.g., ash, reacted sorbent, any condensed liquids, etc.) from the flue gas. The particulate materials present within the flue may vary depending upon the fuel being combusted and/or the reagents (e.g., the $SO_x$ sorbent) introduced into the flue gas during treatment). An example of a PM collector 180 is an electrostatic precipitator which induces electrostatic charge in the particulate materials present within the flue gas such that the particulate materials can be collected. An alternative example of a PM collector 180 is fabric filters (e.g., a "bag house"). The line blower 190 (e.g., an induced draft fan) pulls the flue gas (e.g., cleaned flue gas) out of the PM collector 180 (e.g., electrostatic precipitator) and into FGD 200, where $SO_2$ is removed from the flue gas. The flue gas then passes through the flue gas $CO_2$ processor 210 (e.g., an Econamine FG PlusSM) and out of system 100 via the stack 220.

In an embodiment, a FGT system having a SDSFR $SO_x$ sorbent injector like the FGT system 100 having the SDSFR $SO_x$ sorbent injector 150 disclosed herein with respect to FIGS. 1, 2, and 3 may be advantageously employed in flue gas treatment. For example, the disclosed FGT system 100 may beneficially decrease the costs associated with treatment of a flue gas. For example, and not intending to be bound by theory, because the disclosed SDSFR $SO_x$ sorbent injector determines the rate at which the $SO_x$ sorbent should be injected based upon the character of the flue gas (e.g., the concentration of $SO_3$ within the flue gas as determined via a relationship with the sulfuric acid vapor pressure within the flue gas and the flue gas moisture), the amount of sorbent needed to treat the flue gas (e.g., to sequester all or substantially all of the $SO_3$ within the flue gas, or at least sequester an amount of $SO_3$ sufficient to reduce the concentration of $SO_3$ in the flue gas to less than a desired threshold) can be more accurately ascertained. Conventionally, the concentration of $SO_3$ within the flue gas has been estimated based upon factors other than the actual character of the flue gas and, as such, it was necessary to vastly over-compensate for potential inaccuracies when injecting a sorbent into the flue gas.

Figure 4:
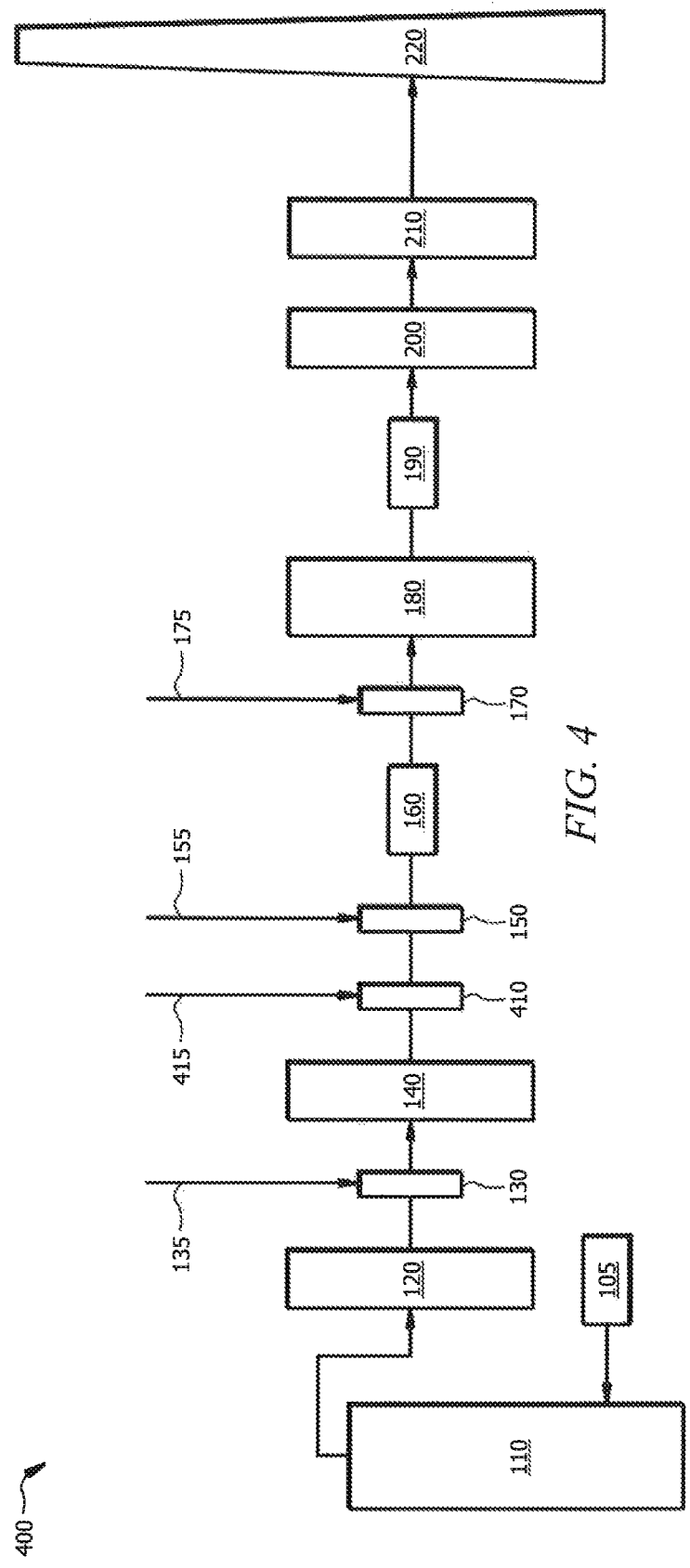
FIG. 4 illustrates an additional or alternative flue gas treatment system according to an embodiment disclosed herein.

Referring to FIG. 4, an additional or alternative embodiment of a FGT system 400 for, among others, removing $NO_x$, $SO_x$, mercury, and $CO_2$ from flue gas is illustrated. In the embodiment of FIG. 4, the FGT system 400 is particularly configured for improving the efficiency of an additive (particularly, a sorbent) that is injected into the flue gas so as to remove a pollutant (particularly, $SO_x$, such as $SO_3$) therefrom.

The FGT system 400 comprises the same components as disclosed with regard to FIG. 1 and is configured to operate as disclosed with respect to FIG. 1 with the exception that the $SO_x$ sorbent injector 150 need not (although, optionally, it may) be the SDSFR $SO_x$ sorbent injector 150 as previously disclosed herein. For example, in the embodiment of FIG. 4, the $SO_x$ sorbent injector 150 may determine the amount of sorbent to be injected into the flue gas based upon the concentration of $SO_3$ within the flue gas as determined via a relationship with the sulfuric acid vapor pressure within the flue gas and the flue gas moisture or, alternatively, the amount of sorbent to be injected into the flue gas based on another parameter (e.g., an estimate based upon system flow-rate, system through-put, and/or system load, as described herein).

Also, the FGT system 400 disclosed with respect to FIG. 4 further comprises flue gas cooler (FGC) 410 generally configured to cool the flue gas to a desired temperature range, as will be disclosed herein. In the embodiment of FIG. 4, the FGC 410 is illustrated as being located between the SCR reactor 140 and the $SO_x$ sorbent injector 150. Alternatively, the FGC 410 may be located at any suitable location within the FGT system 400, for example, a location upstream relative to air heater 160, for example, between the heat exchanger 120 and the $NO_x$ reducing agent injector 130, between the $NO_x$ reducing agent injector 130 and the SCR reactor 140, between $SO_x$ sorbent injector 150 and the air heater 160, or incorporated within one of these components.

In the embodiment of FIG. 4, the FGC 410 is configured to inject water 415 (e.g., atomized water) into the flue to cool the flue gas to a temperature about 20 to 30° F. above the acid dew point for sulfuric acid ($H_2SO_4$). In an embodiment, the FGC 410 may receive signals from one or more sensors within the FGC 410. The signals received from the one or more sensors indicate one or more parameters of the flue gas, as will be disclosed herein. While in an embodiment, the one or more sensors may be located at, proximate to, or associated with the FGC 410; in alternative embodiments, the one or more sensors may be located at any suitable location within the FGT system 400, for example, a location upstream relative to air heater 160.

Figure 5:
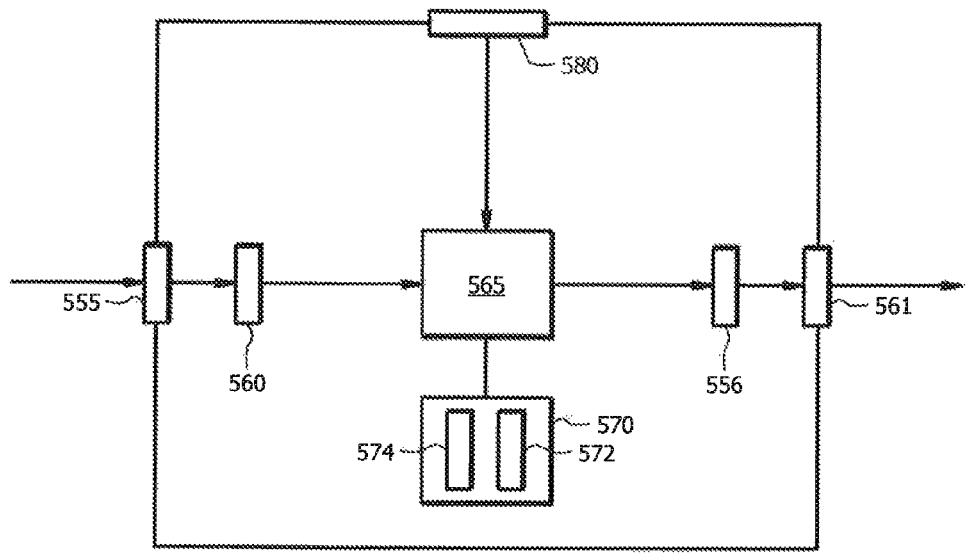
FIG. 5 illustrates an embodiment of a determination and control system for use in the flue gas treatment system of FIG. 4.

In an embodiment, the FGC 410 comprises a determination and control system (DCS), for example, as similarly disclosed with respect to FIG. 2. Referring to FIG. 5, an embodiment of the DCS 500 is illustrated. The DCS comprises ports 555 and 556, transceiver units 560 and 561, a processor 565, memory 570 including a sulfuric acid dew point determination module 572, a water injection rate determination module 574, and a user interface 580. Port 555 receives data signals from sensors monitoring various parameters of the flue gas, for example, flue gas temperature and water vapor pressure and is coupled to the transceiver unit 560. The transceiver unit 560 receives data (e.g., flue gas data) via the port 555. The transceiver unit 560 forwards the received data (e.g., flue gas composition data) to the processor 565.

The processor 565 is generally configured to process data such as the flue gas composition data. In various embodiments, the processor 565 is implemented by hardware and software performed on that hardware, for example, as similarly disclosed with respect to the DCS of FIG. 2.

In FIG. 5, the processor 565 is in signal communication with memory 570. Memory 570 is configured to store data, to store the sulfuric acid dew point determination module 572 (which contains instructions causing the processor 565 to implement instructions so as to determine the sulfuric acid dew point of the flue gas based upon various parameters of the flue gas) and the water injection rate determination module 574 (which contains instructions causing the processor 565 to implement instructions to determine the rate at which water should be injected into the flue gas to cause the flue gas to have a temperature about 20 to 30° F. above the acid dew point for sulfuric acid). While in the embodiment of FIG. 5, the sulfuric acid dew point determination module 572 and the water injection rate determination module 574 are illustrated and disclosed as discreet components; in alternative embodiments, an otherwise similar DCS may include a signal module carrying out the functionalities disclosed herein with respect to the sulfuric acid dew point determination module 572 and water injection rate determination module 574.

Figure 6:
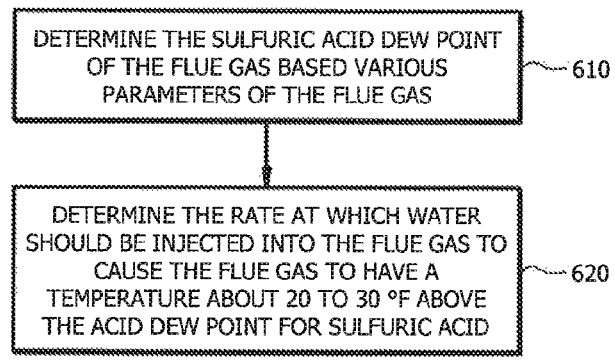
FIG. 6 illustrates an embodiment of an additional or alternative flue gas treatment method.

Referring to FIG. 6, the sulfuric acid dew point determination module 572 and water injection rate determination module 574 cooperatively cause the processor 565 to execute a method 600 that includes the steps of determining the sulfuric acid dew point of the flue gas based upon various parameters of the flue gas (step 610) and determining the rate at which water should be injected into the flue gas to cause the flue gas to have a temperature about 20 to 30° F. above the acid dew point for sulfuric acid (step 620). More particularly, the resulting temperature of the flue gas is about 20 to 30° F. above the acid dew point for sulfuric acid, but not so cool that sulfuric acid forms. Additionally, in an embodiment, the sulfuric acid dew point determination module 572 and water injection rate determination module 574 cause the processor 565 to execute instructions that further include transmitting a control signal effective to control the rate at which the water is injected into the flue gas. While in the embodiment of FIGS. 5 and 6, the steps of determining the sulfuric acid dew point of the flue gas based upon various parameters of the flue gas 610 and, determining the rate at which water should be injected into the flue gas to cause the flue gas to have a temperature about 20 to 30° F. above the acid dew point for sulfuric acid 620 are disclosed as taking place within the DCS 500; in alternative embodiments, one or more of these steps may be distributed to other components.

In an embodiment, a FGT system having a FGC like the FGT system 400 having the FGC 410 disclosed herein with respect to FIGS. 4, 5, and 6 may be advantageously employed in flue gas treatment. For example, the disclosed FGT system 400 may beneficially decrease the costs associated with treatment of a flue gas. For example, and not intending to be bound by theory, decreasing the temperature of the flue gas to a temperature about 20 to 30° F. above the acid dew point for sulfuric acid, but not so cool that sulfuric acid is formed, may increase the residence time of the flue gas within the FGT system 400, for example, thereby allowing improved reaction rates between the sulfur trioxide and the sorbent. As such, the FGT system 400 having the FGC 410 as disclosed herein allows for improved utilization of the sorbent injected into the flue gas and, as such, relatively less sorbent may be used to treat an otherwise similar flue gas.

ADDITIONAL EMBODIMENTS

A first embodiment, which is a method for treating a flue gas comprising determining a sulfur trioxide concentration within the flue gas and determining an injection rate for a sulfur trioxide sorbent based upon the sulfur trioxide concentration.

A second embodiment, which is the method of the first embodiment, further comprising injecting the sulfur trioxide sorbent into the flue gas at the determined injection rate.

A third embodiment, which is the method of one of the first through the second embodiments, wherein determining the sulfur trioxide concentration within the flue gas comprises determining one or more flue gas parameters; and determining the sulfur trioxide concentration within the flue gas based upon a relationship between the flue gas parameters and the sulfur trioxide concentration.

A fourth embodiment, which is the method of the third embodiment, wherein determining the one or more flue gas parameters comprises determining a flue gas sulfuric acid vapor pressure and determining a flue gas moisture.

A fifth embodiment, which is the method of the fourth embodiment, further comprising receiving a signal from a sulfuric acid vapor pressure sensor and a signal from a flue gas moisture sensor.

A sixth embodiment, which is the method of one of the first through the fifth embodiments, wherein the sulfur trioxide sorbent comprises lime, limestone, trona, sodium bisulfate, or combinations thereof.

A seventh embodiment, which is the method of one of the first through the sixth embodiments, further comprising determining a sulfuric acid dew point for the flue gas; and determining a coolant injection rate for a coolant to be injected into the flue gas to cause the flue gas to have a temperature of from about 20 to about 30° F. above the sulfuric acid dew point.

A eighth embodiment, which is the method of the seventh embodiment, further comprising cooling the flue gas to the temperature of from about 20 to about 30° F. above the sulfuric acid dew point.

A ninth embodiment, which is the method of the fourth embodiment, wherein cooling the flue gas to the temperature of from about 20 to about 30° F. above the sulfuric acid dew point comprises injecting the coolant at the coolant injection rate.

A tenth embodiment, which is the method of one of the seventh through the ninth embodiments, wherein the coolant is atomized water.

An eleventh embodiment, which is a system for treating a flue gas, the system comprising a sorbent injector configured to inject a sulfur trioxide sorbent into the flue gas, wherein the sorbent injector comprises a variable-rate feed mechanism configured to inject the sorbent at a selected sorbent injection rate, and a sulfur trioxide sorbent rate processor configured to carry out a method comprising determining a sulfur trioxide concentration within the flue gas and determining an injection rate for the sulfur trioxide sorbent based upon the sulfur trioxide concentration.

A twelfth embodiment, which is the system of the eleventh embodiment, wherein the sulfur trioxide sorbent rate processor is further configured to output a signal effect to cause the variable-rate feed mechanism to inject the sulfur trioxide sorbent into the flue gas at the determined injection rate.

A thirteenth embodiment, which is the system of one of the eleventh through the twelfth embodiments, wherein the sulfur trioxide sorbent rate processor is further configured such that determining the sulfur trioxide concentration within the flue gas comprises determining one or more flue gas parameters and determining the sulfur trioxide concentration within the flue gas based upon a relationship between the flue gas parameters and the sulfur trioxide concentration.

A fourteenth embodiment, which is the system of the thirteenth embodiment, wherein the sulfur trioxide sorbent rate processor is further configured such that determining the one or more flue gas parameters comprises determining a flue gas sulfuric acid vapor pressure and determining a flue gas moisture.

A fifteenth embodiment, which is the system of the fourteenth embodiment, further comprising a flue gas sulfuric acid vapor pressure sensor and a flue gas moisture sensor.

A sixteenth embodiment, which is the system of one of the eleventh through the fifteenth embodiments, wherein the sulfur trioxide sorbent comprises lime, limestone, trona, sodium bisulfate, or combinations thereof.

A seventeenth embodiment, which is the system of one of the eleventh through the sixteenth embodiments, wherein the system further comprises a coolant injector configured to inject a coolant into the flue gas, wherein the coolant injector comprises a variable-rate injection mechanism configured to inject the coolant at a selected coolant injection rate, and a coolant rate processor configured to carry out a method comprising determining a sulfuric acid dew point for the flue gas and determining a coolant injection rate for the coolant to be injected into the flue gas to cause the flue gas to have a temperature of from about 20 to about 30° F. above the sulfuric acid dew point.

An eighteenth embodiment, which is the system of the seventeenth embodiment, wherein the coolant rate processor is further configured to output a signal effect to cause the variable-rate injection mechanism to inject the coolant at the coolant injection rate.

A nineteenth embodiment, which is the system of one of the seventeenth through the eighteenth embodiments, wherein the coolant is atomized water.

A twentieth embodiment, which is a method for treating a flue gas comprising determining a sulfuric acid dew point for the flue gas and determining a coolant injection rate for a coolant to be injected into the flue gas to cause the flue gas to have a temperature of from about 20 to about 30° F. above the sulfuric acid dew point.

A twenty-first embodiment, which is the method of the twentieth embodiment, further comprising cooling the flue gas to a temperature of from about 20 to about 30° F. above the sulfuric acid dew point.

A twenty-second embodiment, which is the method of the twenty-first embodiment, wherein cooling the flue gas to the temperature of from about 20 to about 30° F. above the sulfuric acid dew point comprises injecting the coolant at the coolant injection rate.

A twenty-third embodiment, which is the method of one of the twentieth through the twenty-second embodiments, wherein the coolant is atomized water.

A twenty-fourth embodiment, which is a system for treating a flue gas, the system comprising a coolant injector configured to inject a coolant into the flue gas, wherein the coolant injector comprises a variable-rate injection mechanism configured to inject the coolant at a selected coolant injection rate, and a coolant rate processor configured to carry out a method comprising determining a sulfuric acid dew point for the flue gas and determining a coolant injection rate for the coolant to be injected into the flue gas to cause the flue gas to have a temperature of from about 20 to about 30° F. above the sulfuric acid dew point.

A twenty-fifth embodiment, which is the system of the twenty-fourth embodiment, wherein the coolant rate processor is further configured to output a signal effect to cause the variable-rate injection mechanism to inject the coolant at the coolant injection rate.

A twenty-sixth embodiment, which is the system of one of the twenty-fourth through the twenty-fifth embodiments, wherein the coolant is atomized water.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as "comprises," "includes" and "having" should be understood to provide support for narrower terms such as "consisting of,", "consisting essentially of," and "comprised substantially of."

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A method for treating a flue gas comprising:
   determining a sulfur trioxide concentration within the flue gas; and
   determining an injection rate for a sulfur trioxide sorbent based upon the sulfur trioxide concentration;
   determining a sulfuric acid dew point for the flue gas; and
   determining a coolant injection rate for a coolant to be injected into the flue gas to cause the flue gas to have a temperature of from about 20 to about 30° F. above the sulfuric acid dew point, wherein the coolant is injected into the flue gas upstream of the sulfur trioxide sorbent.

2. The method of claim 1, further comprising injecting the sulfur trioxide sorbent into the flue gas at the determined injection rate.

3. The method of claim 1, wherein determining the sulfur trioxide concentration within the flue gas comprises:
 determining one or more flue gas parameters; and
 determining the sulfur trioxide concentration within the flue gas based upon a relationship between the flue gas parameters and the sulfur trioxide concentration.

4. The method of claim 3, wherein determining the one or more flue gas parameters comprises determining a flue gas sulfuric acid vapor pressure and determining a flue gas moisture.

5. The method of claim 4, further comprising receiving a signal from a sulfuric acid vapor pressure sensor and a signal from a flue gas moisture sensor.

6. The method of claim 1, wherein the sulfur trioxide sorbent comprises lime, limestone, trona, sodium bisulfate, or combinations thereof.

7. The method of claim 1, further comprising cooling the flue gas to the temperature of from about 20 to about 30° F. above the sulfuric acid dew point upstream of the injection point of the sulfur trioxide sorbent.

8. The method of claim 7, wherein cooling the flue gas to the temperature of from about 20 to about 30° F. above the sulfuric acid dew point comprises injecting the coolant at the coolant injection rate.

9. The method of claim 1, wherein the coolant is atomized water.

10. The method of claim 1, further comprising:
 combusting a fuel with air to form the flue gas and heat; and
 generating power using the heat, wherein determining the injection rate for the sulfur trioxide sorbent is further based upon at least one of: a power output, a composition of the fuel, or a combustion flowrate of the air.

* * * * *